United States Patent
Daga et al.

(10) Patent No.: US 9,280,571 B2
(45) Date of Patent: Mar. 8, 2016

(54) SYSTEMS, METHODS, AND COMPUTER PROGRAM PRODUCTS FOR SCHEDULING PROCESSING TO ACHIEVE SPACE SAVINGS

(71) Applicant: NetApp, Inc., Sunnyvale, CA (US)

(72) Inventors: Vinod Kumar Daga, Santa Clara, CA (US); Craig Johnston, Livermore, CA (US); Ling Zheng, Saratoga, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/460,032

(22) Filed: Aug. 14, 2014

(65) Prior Publication Data

US 2014/0358873 A1     Dec. 4, 2014

Related U.S. Application Data

(63) Continuation of application No. 13/436,554, filed on Mar. 30, 2012, now Pat. No. 8,812,456.

(51) Int. Cl.
*G06F 17/30* (2006.01)

(52) U.S. Cl.
CPC .... *G06F 17/30303* (2013.01); *G06F 17/30079* (2013.01); *G06F 17/30156* (2013.01); *G06F 17/3015* (2013.01)

(58) Field of Classification Search
None
See application file for complete search history.

(56) References Cited

U.S. PATENT DOCUMENTS

| | | | |
|---|---|---|---|
| 5,990,810 A | 11/1999 | Williams | |
| 7,979,654 B2 | 7/2011 | Stager et al. | |
| 8,019,789 B2 | 9/2011 | Dahms et al. | |
| 8,095,756 B1 | 1/2012 | Somavarapu et al. | |
| 8,112,661 B1 | 2/2012 | La France et al. | |
| 8,117,464 B1 | 2/2012 | Kogelnik | |
| 8,165,221 B2 | 4/2012 | Zheng et al. | |
| 8,554,918 B1 | 10/2013 | Douglis | |
| 2009/0182789 A1* | 7/2009 | Sandorfi et al. | 707/204 |
| 2012/0166403 A1 | 6/2012 | Kim et al. | |

OTHER PUBLICATIONS

U.S. Appl. No. 11/105,895, filed Apr. 13, 2005, by inventors Ling Zheng, Blake H. Lewis, Daniel W. Ting, Robert M. English, and Stephen L. Manley for "Method and Apparatus for Identifying and Eliminating Duplicate Data blocks and Sharing Data Blocks in a Storage System," 32 pages of text, 14 pages of drawings.
U.S. Patent Office—International Searching Authority, "PCT Notification of Transmittal of the International Search Report and the Written Opinion of the International Searching Authority, or the Declaration" dated May 21, 2013 for Application No. PCT/US2013/030279, 8 pages, Alexandria, Virginia.

* cited by examiner

*Primary Examiner* — Hung Q Pham
(74) *Attorney, Agent, or Firm* — Gilliam IP PLLC

(57) ABSTRACT

A method performed in a system that has a plurality of volumes stored to storage hardware, the method including generating, for each of the volumes, a respective space saving potential iteratively over time and scheduling space saving operations among the plurality of volumes by analyzing each of the volumes for space saving potential and assigning priority of resources based at least in part on space saving potential.

18 Claims, 3 Drawing Sheets

SYSTEMS, METHODS, AND COMPUTER PROGRAM PRODUCTS FOR SCHEDULING PROCESSING TO ACHIEVE SPACE SAVINGS

CROSS-REFERENCE TO RELATED APPLICATION

This application is a continuation of U.S. Ser. No. 13/436,554, filed Mar. 30, 2012, by inventors Vinod Kumar Daga et al., entitled "SYSTEMS, METHODS, AND COMPUTER PROGRAM PRODUCTS FOR SCHEDULING PROCESSING TO ACHIEVE SPACE SAVINGS", which is herein incorporated by reference in its entirety.

TECHNICAL FIELD

The present description relates, in general, to space saving operations (e.g., compression and deduplication) in network storage systems and, more specifically, to techniques for allocating space saving resources among volumes in a deduplication process.

BACKGROUND

Many enterprises include network storage systems, such as Network Attached Storage (NAS) and Storage Area Networks (SANs), which are connected to client computing systems, whereby clients can access data managed by the storage systems. From the user's (e.g., client's) point of view, the network storage system may include one or more storage objects (storage volumes), often referred to as logical or virtual volumes. Such network storage systems may store very large amounts of duplicate data, and therefore it may be desirable in some instances to perform deduplication in order to use available storage space more efficiently. To the extent that data can be deduplicated in a network storage system, the removal of the duplicate data may in some cases provide significant storage space savings, thereby potentially saving money.

Some conventional techniques for network storage implement file systems corresponding to respective virtual volumes that provide a hierarchical organization of lower-level storage containers (e.g., files) logically organized within a virtual volume and employ pointers to point to the underlying data, where the underlying data is arranged in data blocks. A given file may point to multiple blocks, and a block may be associated with multiple files. Furthermore, a given file may include data that is duplicated in another file. For instance, a storage volume may include multiple email inboxes, each inbox including a particular email attachment. In most scenarios it would be undesirable to store multiple copies of the email attachment because doing so would be wasteful of storage resources. Some conventional deduplication operations avoid saving multiple copies of a piece of data by keeping only a single copy of the data and replacing the duplicate copies with pointers to the single copy. Therefore, multiple files are associated with the same data, but duplicate copies of the data are avoided.

Deduplication operations may use a significant amount of processing resources. In one example, a conventional deduplication process begins on a volume that has not yet been deduplicated. The conventional deduplication process includes reading the data blocks from storage (usually a hard disk), creating fingerprints for each of the data blocks (e.g., a fingerprint can be a small piece of data indicative of the data in a block), and comparing the fingerprints to determine which of the blocks may be duplicates. Duplicate data is then replaced by pointers, as described above. Generally, however, this process may use a noticeable amount of processing power, which may manifest itself as reduced performance from the user's perspective. Furthermore, reading a large number of data blocks from disk may take a relatively long time.

Another conventional deduplication process generates fingerprints of the data blocks as the data blocks are saved or are transferred from one volume to another (e.g., in a backup operation). This should eliminate reading an entire volume in a single operation to fingerprint the entire volume, contrasted with the example above. However, merely comparing the fingerprints to each other may use a noticeable amount of processing resources.

In short, deduplication processes may result in a perceived lack of performance from the user's point of view because of the processing resources that are allocated to the deduplication processes and not used for concurrent storage and retrieval operations that are more visible to the user. Assuming that a network storage system has a limited amount of processing resources to devote to the various operations that it performs, it would be desirable to perform deduplication efficiently so as to get the most amount of deduplication from the least amount of processing resources.

BRIEF DESCRIPTION OF THE DRAWINGS

The present disclosure is best understood from the following detailed description when read with the accompanying figures.

SUMMARY

Figure 1:
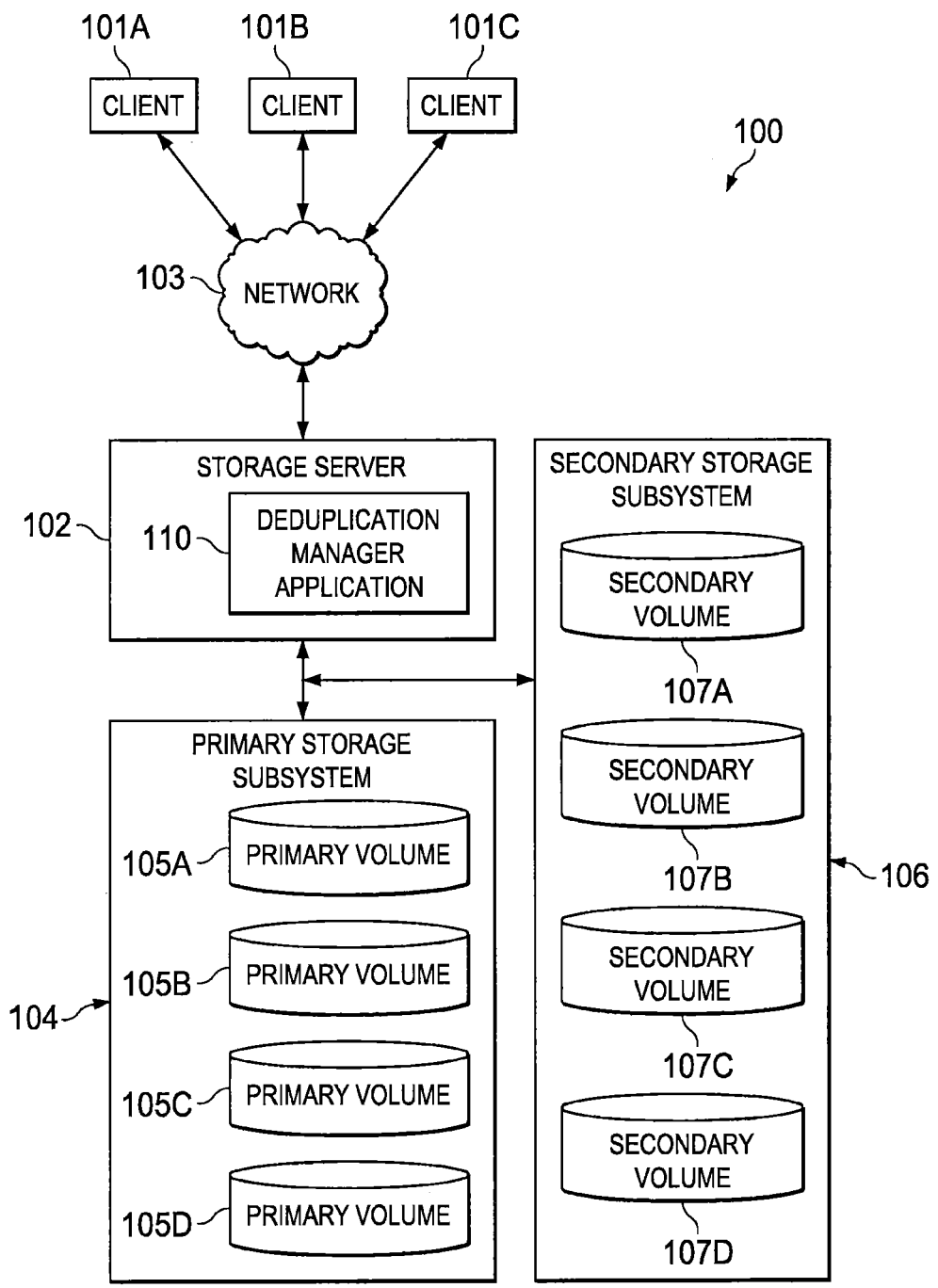
FIG. 1 is an illustration of an example network storage system implementing a storage operating system in which various embodiments may be implemented.

Various embodiments include systems, methods, and computer program products providing an efficient approach to allocating deduplication resources. In one example, multiple deduplication operations are performed for multiple storage objects so that incoming data for each of the storage objects is deduplicated into existing data from time to time. Deduplication values are calculated for each of the storage objects based on results of the deduplication operations. The deduplication values provide an indication of an amount of deduplication achieved over time for each of the storage objects. In this example it is assumed that past results for a storage object are an indication of expected future performance, therefore, the deduplication values are indications of deduplication savings potentials. In subsequent deduplication operations, the storage objects with higher deduplication potentials are selected for deduplication before other storage objects with lower potentials. Storage objects that show a higher deduplication potential over time may eventually be added to a preferred list. In this manner, storage objects that have higher potential for space savings are given priority to the deduplication resources.

One of the broader forms of the present disclosure involves a method performed in a system that has a plurality of storage objects stored to storage hardware, the method including generating, for each of the storage objects, a respective space saving potential iteratively over time and scheduling space saving operations among the plurality of storage objects by analyzing each of the storage objects for space saving potential and assigning priority of resources based at least in part on space saving potential.

Another of the broader forms of the present disclosure involves a computer program product having a computer readable medium tangibly recording computer program logic for managing space saving for a plurality of storage objects, the computer program product including code to perform a plurality of space saving operations over time on the plurality of storage objects, code to calculate a respective space saving value for each of the storage objects so that each subsequent space saving operation for a given storage object results in an iterative recalculation of space saving value for the given storage object, and code to allocate processing resources to space saving requests by prioritizing the processing resources for a subset of the storage objects with higher respective space saving values.

Another of the broader forms of the present disclosure involves a system including a storage subsystem including a non-volatile storage media, the non-volatile storage media being virtually divided into a plurality of storage objects and a computer in communication with the storage subsystem managing allocation of processing resources for space saving within the plurality of storage objects, the computer configured to perform the following actions: calculating a respective space saving potential for each of the storage objects iteratively over multiple space saving operations and selecting among the storage objects for space saving so that a first storage object, having a first space saving potential higher than a second space saving potential of a second storage object, receives preference in allocation of the processing resources for space saving based at least in part on a difference between the first and second space saving potentials.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that various embodiments may be implemented in any kind of network environment. For example, some embodiments may be implemented in a TCP/IP network connecting multiple clients and multiple servers. Other embodiments may be implemented in more specialized environments, such as in a Network Attached Storage (NAS), a Storage Area Network (SAN), or any other network storage configuration. Various embodiments are not limited to any particular network architecture or purpose and may be adapted for use in a wide-ranging array of environments.

Various embodiments disclosed herein provide techniques to allocate deduplication resources according to a calculated potential of a given volume. Volumes with a higher deduplication potential are, therefore more likely to be deduplicated, whereas volumes with lower deduplication potential are less likely to be deduplicated.

In some systems, the total workload for deduplication may be larger than the amount of processing resources in the system that may be allocated to deduplication. For instance, deduplication may be processing-intensive in some applications, and the system may run deduplication operations only insofar as they do not degrade storage and retrieval functions beyond a performance expectation of the customer. Accordingly, some volumes may forgo deduplication due to the finite processing resources of the system.

Example embodiments described herein provide a solution for the issue of finite processing resources by using those processing resources on volumes that are most likely to see a benefit in storage space savings. In one example, various volumes are grouped in a first list, also called the standby list in this example. As time goes on, the volumes may be deduplicated, and a deduplication value is calculated for each volume to provide an indication of the deduplication potential for that volume. In some instances, the deduplication value is calculated using an amount of space saved for a given volume through deduplication. Deduplication may be performed on incoming data from time to time for each of the volumes, and the deduplication value is calculated iteratively so that successive deduplication operations affect the deduplication value for a volume according to a space savings achieved by that deduplication operation. The deduplication value is backward-looking from one perspective because it is calculated using deduplication results (e.g., space savings) achieved in the past. The deduplication value is also forward-looking because it is assumed in this example that past deduplication results are an indication of future savings.

Over time, the volumes will have different deduplication values associated with each one. As mentioned above, the device running the deduplication application (e.g., the network storage server) will choose more often for deduplication the volumes that have higher savings potentials. Some volumes that show consistently higher savings potentials may eventually be moved to a preferred list, in which the volumes are deduplicated before any of the volumes in the standby list are deduplicated. Thus, this example embodiment populates a preferred list by selecting ones of the volumes that demonstrate higher space savings potential. In some instances, volumes that show the least savings potential may be moved to a third list, which removes those volumes from consideration for deduplication.

A similar process may be used for other space saving technologies, such as compression and the like. For instance, some embodiments may calculate a space saving value for compression iteratively over time and then schedule compression processing resources so that volumes with a higher space saving potential are compressed before other volumes.

FIG. 1 is an illustration of an example network storage system 100 implementing a storage operating system (not shown) in which various embodiments may be implemented. Storage server 102 is coupled to a set of clients 101 through a network 103. The network 103 may include, for example, a local area network (LAN), wide area network (WAN), the Internet, a Fibre Channel fabric, or any combination of such interconnects. The server 102, the primary storage subsystem 104, and the secondary storage subsystem 106 may be connected to a common communication and data transfer infrastructure, such as Fibre Channel, and may collectively comprise a SAN or a NAS.

Each of the clients 101 may include, for example, a personal computer (PC), a traditional server computer, a workstation, handheld computing/communication device or tablet, and/or the like. FIG. 1 shows three clients 101a-c, but the scope of embodiments can include any appropriate number of clients.

One or more of clients 101 may act as a management station in some embodiments. Such client may include management application software that is used by a network administrator to configure storage server 102, to provision storage in primary storage subsystem 104, and to perform other management functions related to the storage network, such as scheduling backups, setting user access rights, and the like.

The storage server 102 manages the storage of data in the primary storage subsystem 104. The storage server 102 handles read and write requests from the clients 101, where the requests are directed to data stored in, or to be stored in, primary storage subsystem 104. Primary storage subsystem 104 is not limited to any particular storage technology and can use any storage technology now known or later developed. For example, primary storage subsystem 104 has a number of nonvolatile mass storage devices (not shown), which may include conventional magnetic or optical disks or tape drives, non-volatile solid-state memory, such as flash memory, or any combination thereof. In one particular example, the primary storage subsystem 104 may include one or more Redundant Arrays of Independent Disks (RAIDs). In this example, primary storage subsystem 104 includes multiple virtual volumes represented here by primary volumes 105.

Similarly, storage server 102 handles backup operations at secondary storage subsystem 106. Secondary storage subsystem 106 is not limited to any particular storage technology, but may use conventional magnetic or optical disks or tape drives, non-volatile solid-state memory, such as flash memory, one or more RAIDs, or any combination thereof. Secondary volumes 107 may include multiple virtual volumes.

Storage server 102 in this example provides deduplication operations on the volumes 105 and/or on the volumes 107. Specifically, storage server 102 includes space saving manager application 110, which executes instructions to deduplicate and/or compress data (or use any other space saving technology) according to the methods of FIGS. 2-4.

The storage server 102 may allow data access according to any appropriate protocol or storage environment configuration. In one example, storage server 102 provides file-level data access services to clients 101, as is conventionally performed in a NAS environment. In another example, storage server 102 provides block-level data access services, as is conventionally performed in a SAN environment. In yet another example, storage server 102 provides both file-level and block-level data access services to clients 101.

In some examples, storage server 102 has a distributed architecture. For instance, the storage server 102 in some embodiments may be designed as a physically separate network module (e.g., an "N-blade") and data module (e.g., a "D-blade"), which communicate with each other over a physical interconnect. In furtherance of a distributed architecture, one or more functions of space saving manager 110 may be implemented by hardware and/or software at secondary storage subsystem 106 and/or at primary storage subsystem 104. The storage operating system runs on server 102 and provides space saving manager 110, and in various embodiments storage subsystems 104 and 106 may include specialized hardware and/or software, compatible with the storage operating system, to accomplish space savings.

System 100 is shown as an example only. Other types of hardware and software configurations may be adapted for use according to the features described herein. For instance, various embodiments may be implemented in any system that has a plurality of volumes, whether network-based or not.

Figure 2:
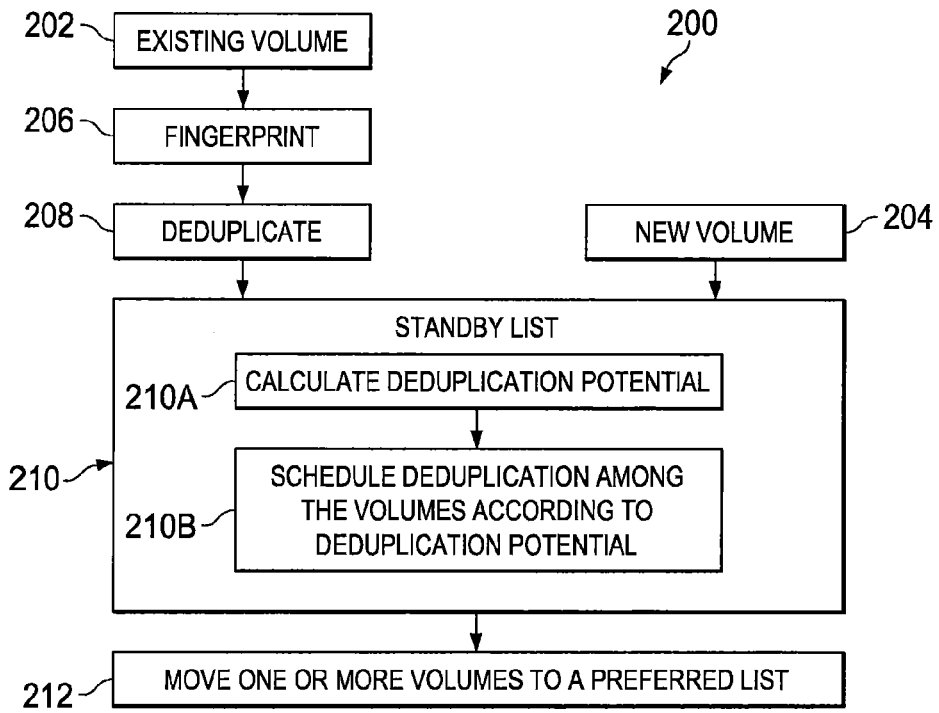
FIG. 2 is an illustration of an example method, adapted according to one embodiment, to schedule deduplication operations among a multitude of volumes.

FIG. 2 is an illustration of exemplary method 200 adapted according to one embodiment. Method 200 may be performed by space saving manager 110 of FIG. 1 to deduplicate and/or compress a multitude of storage volumes. FIG. 2 is provided to illustrate how the space saving manager may approach the space saving process from the initial point of being assigned a volume (existing or new) to control. FIG. 2 does not exclude the possibility that other volumes have already been deduplicated and had deduplication values calculated.

The example of FIG. 2 focuses on deduplication as a space saving technology, and it is understood the scope of embodiments includes any appropriate space saving technology. For instance, some embodiments may use compression, and the principles described below apply as well to compression as to deduplication.

In action 202 the space saving manager (in this example, a deduplication manager) begins the process for an existing volume. For instance, the existing volume may be a volume that already has more than an insignificant amount of data stored thereto.

In action 204, the deduplication manager begins the process for a new volume. For instance, a new volume may be a volume that has not had little or no data stored thereto. The difference between beginning the process for an existing volume (action 202) versus that for a new volume (action 204) is that the existing volume already has data to be fingerprinted and deduplicated, whereas the new volume can skip the fingerprinting and deduplicating and go straight to change logging (as described further below).

In action 206, the deduplication manager generates fingerprints for the data in the existing volume. As mentioned above, some embodiments include saving data on the volume in fixed-size pieces called data blocks. One example of generating a fingerprint includes hashing a block using an algorithm, such as Message Digest algorithm 5 (MD5), to generate a number that is much smaller in bit size than the original data block but still provides an indication of the contents of the data block. MD5 is exemplary only, as any appropriate fingerprinting algorithm can be used by various embodiments.

For instance, some fingerprinting algorithms may generate fingerprints for a unit of data less than the size of a block or more than the size of a block. In fact, some fingerprint algorithms have variable-length capabilities so as to be adaptable to pieces of data different than data block boundaries. Moreover, some embodiments may employ a strong fingerprint so that the likelihood of different data blocks having the same fingerprint is very low. Other embodiments may employ a weaker fingerprint, accepting a slightly greater risk of two different data blocks having the same fingerprint, with the tradeoff being that less processing may be necessary to generate a weaker fingerprint. The scope of embodiments is not limited to any particular process for generating fingerprints.

Furthermore, action 206 may include reading data from the physical storage media underlying the storage volume and then generating the fingerprints from the data after the data is read. As mentioned above, in some systems reading data from the physical storage media may be processing-intensive. Action 206 may also include saving the fingerprints to a fingerprint database.

In action 208, the deduplication manager performs deduplication on the existing volume using the fingerprints in the fingerprint database. Fingerprints are used as proxies for the underlying data, being compared against one another to identify duplicate fingerprints. In order to identify duplicate fingerprints, the deduplication manager may sort the fingerprint database by fingerprint in ascending or descending order. For instance, each fingerprint may include an alphanumeric hash value (or Boolean hash value or any other appropriate hash value), and the deduplication engine may sort by hash value. Duplications are indicated by identical hashes, which are adjacent after sorting. If duplicate fingerprints are found, the deduplication manager retrieves the actual data blocks from the volume and performs a byte-by-byte comparison of the data blocks. If the byte-by-byte comparison verifies that the data blocks are duplicates, the deduplication engine replaces each of the duplicate data blocks, except for one, with a pointer to the single, retained copy. In some instances, the fingerprint may be strong enough that a byte-by-byte comparison of suspected duplicate blocks may be omitted, so that blocks indicated as duplicates by their fingerprints may be deduplicated without further verification.

Action 208 may also include calculating a deduplication value for the existing volume. For instance, if the deduplication process eliminates 200 Gigabytes (GB) from a 1 Terabyte (TB) volume, the savings may be twenty percent for the first TB.

In action 210, the deduplication engine assigns the existing volume to the standby list and also assigns the new volume to the standby list. As mentioned above, method 200 does not exclude additional volumes already in-process, and other volumes may additionally be assigned to the standby list. Also, other volumes may already be assigned to a preferred list (explained further below).

The deduplication manager performs change logging for the volumes on the standby list. Change logging, in this example, includes creating fingerprints of the data stored to a particular volume as the data is written to the volume. The change log represents the data changes to the volume since the most recent deduplication process. The change log for a volume grows as data is written to the volume since the last deduplication process. During the next deduplication process, the deduplication manager compares the fingerprints in the change log to the other fingerprints in the change log to determine whether duplicate data has been added.

The deduplication manager may also compare the change log to the fingerprint database. As explained above, when duplicate fingerprints are found, the underlying data blocks may or may not be verified as duplicates before only a single, retained copy is kept and the rest of the blocks are replaced by references to the single, retained block (e.g., pointers). Duplicate fingerprints are deleted and the remaining fingerprints of the change log are added to the fingerprint database, and so the fingerprint database grows with each deduplication operation. Similarly, the change log grows between deduplication operations but returns to zero or nearly zero at the completion of a deduplication operation.

Action 210a includes calculating a deduplication potential for each of the volumes on the standby list. With each deduplication operation for a given volume, the deduplication value for that volume is updated to account for the space savings achieved by the most recent deduplication operation. In many instances, this iterative calculation of the deduplication value includes using a weighted average for the old and new space savings. In one example above, a deduplication value of twenty percent for the first TB was calculated. Continuing with that example, if a subsequent deduplication operation results in a space savings of ten percent for 100 GB of data, then the calculation may weigh the twenty percent savings ten times more in the calculation than it weights the ten percent savings (because 1 TB is ten times 100 GB). The resulting deduplication value is 19.1% for 1.1 TB. The deduplication value is iteratively calculated for each volume for each deduplication operation.

In one example, the deduplication manager records the amount of user data to which the savings potential applies when its updates the savings potential. After a subsequent operation, the deduplication manager weights the old savings potential with that amount and adds in the new savings potential weighted by the amount of data processed in the operation. Equation (1) provides one example technique to iteratively calculate a savings potential. Eq. (1) New SP=(Old SP*old volume size)+(Operation SP*data processed by operation))/(old volume size+data processed by operation), where SP is the savings potential, and New volume size=amount of user data in the volume. A space saving manager can use any appropriate data structure to store such information.

Each of the volumes continually stores data as it is in operation, growing its change log accordingly. In one example, when a change log reaches a pre-determined capacity threshold (e.g., is twenty percent full), the deduplication manager enters a deduplication request into its deduplication queue for that particular volume. As explained below at action 210b, the requests in the deduplication queue are not necessarily completed in the order in which they are entered. Instead, the deduplication operations described above for the volumes in the standby log are allocated according to the deduplication potential for the given volume.

At action 210b, the deduplication manager schedules deduplication among the standby list volumes according to deduplication potential. For instance, before deduplicating the standby list volume, the deduplication manager examines the deduplication values of each of the volumes with a request in the deduplication queue. Standby list volumes having higher deduplication values are selected for deduplication before other standby list volumes having lower deduplication values. However, volumes on the preferred list are selected before volumes on the standby list, as explained in more detail below with respect to FIGS. 3 and 4.

Action 212 includes moving one or more volumes from the standby list to the preferred list. Thus, in one aspect, some volumes are moved from one list to another over time according to deduplication potential and available system resources. Action 212 may, itself, be considered a way of scheduling deduplication operations according to deduplication potential because requests for preferred list volumes are processed before requests for standby list volumes in this example.

Method 200 checks if the deduplication rate of a volume can keep up with the actual data change rate for the volume. If the deduplication of the volume can keep up, the volume may be a candidate for the preferred list. For example, a volume may be moved from the standby list to the preferred list if its change log has not overflowed within a predetermined period of time and if the system has enough available resources to ensure that the volume (and any other volumes in the preferred list) can be deduplicated in a timely manner. In the example above, the deduplication manager places a deduplication request in the deduplication queue when a volume's change log reaches the predetermined capacity threshold (e.g., twenty percent full). As a request sits in the deduplication queue waiting to be completed, the change log of the corresponding volume increases from twenty percent, perhaps even to one hundred percent, wherein it is referred to as having overflowed. An overflowed change log is cleared at the next deduplication operation for that volume. Change log overflows may generally be undesirable because when a change log overflows, the deduplication manager may fail to detect some duplicates and fail to add some fingerprints to the fingerprint database. Thus, for a volume with a realizable savings potential, a change log overflow may reduce the savings provided. The deduplication manager may be notified of a change log overflow in any appropriate manner, such as by employing a notification which is sent to the deduplication manager when the change log overflows and the periodically after that.

A volume with a higher deduplication potential may be expected to be deduplicated more often, and acted upon earlier in the deduplication queue, and therefore be less likely to have a change log overflow. Accordingly, a span of time since a change log has overflowed may be used in some embodiments as a way to identify the volumes with the best savings potentials.

However, the scope of embodiments is not limited to any particular technique for identifying volumes to move to the preferred list. For instance, other embodiments may base the criteria for moving a volume to the preferred list solely on the deduplication value, or on a number of deduplications performed within a predetermined span of time, or any other appropriate metric.

Action 212 may also include moving some of the standby list volumes from the standby list to a third list in which volumes are not considered for deduplication. Volumes that have a least amount of deduplication savings potential may be moved to the third list. In one example embodiment, a volume left with a change log overflow for a predetermined span of time may be moved to the third list, though the scope of embodiments may include any appropriate technique for determining that a volume should be moved to the third list.

Various embodiments may add, omit, rearrange, or modify the actions of method 200. For instance, some embodiments include performing actions 202, 204, 206, 208 as often as a different existing volume or a different new volume is presented to the deduplication manager. Furthermore, some embodiments may also include moving volumes from the preferred list to the standby list in cases, e.g., when system resources decrease. Thus, some embodiments provide for a continuous operation that adapts to a variable availability of system resources by moving volumes from a standby list to a preferred list and perhaps back again to the standby list. Such embodiments may use any appropriate technique to select preferred list volumes to move to the standby list, including, e.g., selecting one or more preferred list volumes with a lowest deduplication potential. The number of preferred list volumes moved back to the standby list may be determined based upon, e.g., the amount to which system resources have changed.

A change in system resources may refer to a number of different changes in the system. One type of change in system resources includes adding more disks and/or processors to the system, which may be seen as an increase in system resources because such additions allow the system to do more processing. Similarly, a decrease in disks or processors may be seen as a decrease in system resources. Another change in resources includes when the user workload increase or decreases, which results in a decrease or increase in remaining system resources.

Fingerprinting is specific to deduplication, and other technologies such as compression may forego fingerprinting and, instead, compress all or nearly all data added data. Further, in an example system that uses compression, the system may calculate a space saving potential for compression and allocate compression processing resources according to the calculated space saving potential.

Figure 3:
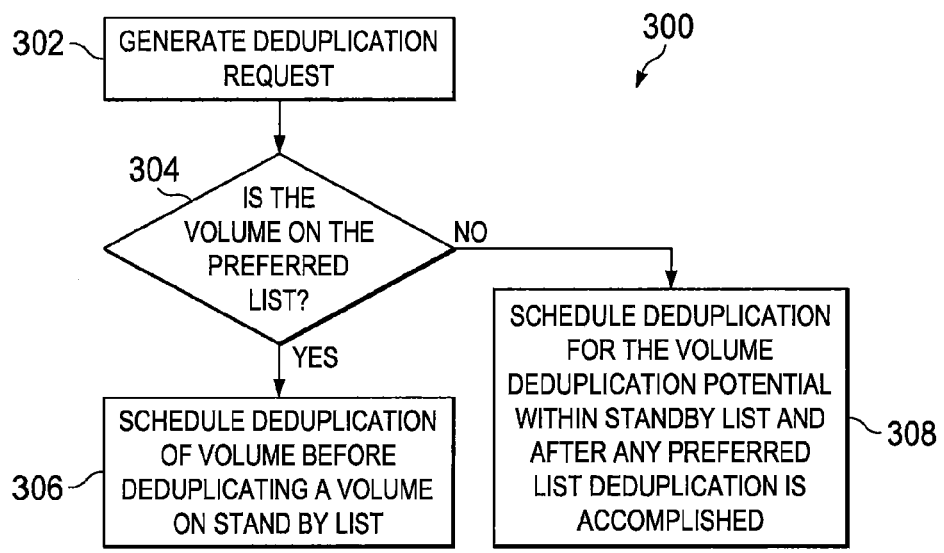
FIG. 3 is an illustration of an example method, adapted according to one embodiment, for allocating resources for deduplication among a multitude of volumes, operable with the method shown in FIG. 2.

FIG. 3 is an illustration of example method 300, adapted according to one embodiment, for allocating resources for deduplication among a multitude of volumes. Once again, FIG. 3 focuses on deduplication, but it is understood that the principles of FIG. 3 apply as well to other space saving technologies. Method 300 may be performed by a space saving manager at a storage server or elsewhere in a storage system.

In action 302, the deduplication manager generates a deduplication request and places the request in a deduplication queue. In an example above, the deduplication manager places a request in the deduplication queue for a volume when the volume's change log reaches twenty percent full. However, the scope of embodiments is not limited to that technique. Various embodiments may use any criterion or combination of criteria to determine when to generate a deduplication request.

In action 304, it is discerned whether the request is for a volume in the preferred list. If the request is for a volume in the preferred list, then at action 306 the deduplication manager schedules deduplication on the volume ahead of other volumes. The action 306 may include assigning a higher priority to the request than to another request for a volume on the standby list.

If the request is for a volume not on the preferred list, then at action 308 the deduplication manager schedules deduplication of the volume based on deduplication savings potential within the standby list. In other words, if other volumes in the standby list have a higher potential and have pending deduplication requests, the request of action 302 may wait to be processed behind the other requests. Additionally, the request would be processed, if ever, after any preferred list volumes are processed.

It was noted above at action 308 that the deduplication resources, at least within the standby list, may be allocated according to a deduplication value of the corresponding volumes. However, various embodiments may approach allocation with more flexibility and sophistication than merely ranking volumes by deduplication value. In one example, two or more volumes have similar deduplication values (e.g., 25 percent and 30 percent, respectively), and it is assumed that their deduplication savings potentials are similar as well. Accordingly, such example embodiment may allocate deduplication resources as between these two volumes according to which volume has the largest change log. In this way, the deduplication manager works to minimize the chance that one of these volumes has a change log overflow. Other modifications and additions may be adapted for use in some embodiments to further promote efficiency within the deduplication process.

Figure 4:
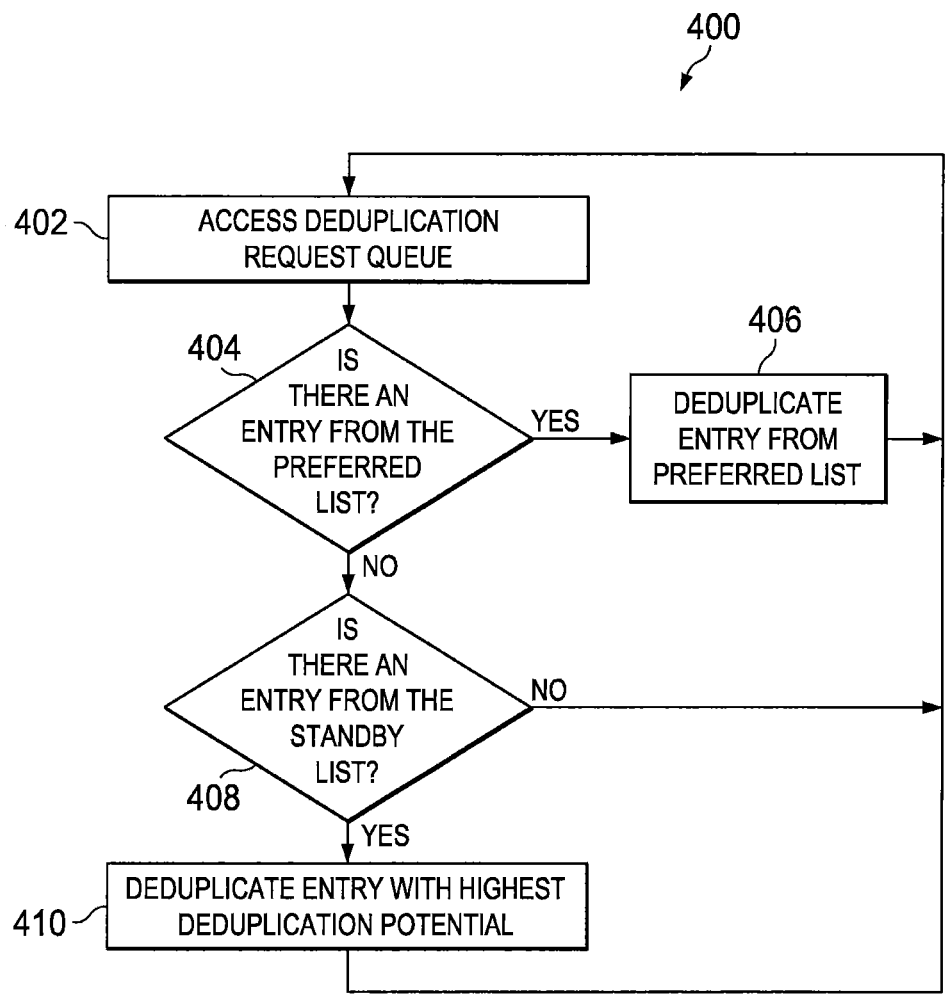
FIG. 4 is an illustration of an example method, adapted according to an embodiment, to allocate deduplication resources among volumes, operable with the method shown in FIG. 2.

FIG. 4 is an illustration of example method 400, adapted according to an embodiment, to allocate space saving resources among volumes. Whereas FIG. 3 is shown more conceptually, FIG. 4 is intended to illustrate a particular technique for a space saving manager to traverse a deduplication queue that has a multitude of entries therein. Therefore, FIG. 4 illustrates at least one way to select deduplication requests from the queue according to the principles given above to allocate resources to more promising volumes first. The principles of FIG. 4 may be applied to systems that implement other space saving technologies, such as compression and the like.

At action 402, the deduplication engine accesses the deduplication request queue. In some embodiments, deduplication operations may be run only at certain times of the day and/or may be limited by number that may be performed at any given time. Therefore, action 402 may be performed at some predetermined time or event at which a deduplication operation is begun.

At action 404, the deduplication engine examines the queue for whether there is a deduplication request for a volume in the preferred list. If there is a request for a preferred list volume, the deduplication engine deduplicates the volume at action 406. In some instances there may be more than one request for a preferred list volume in the queue. Various embodiments may use any appropriate technique to determine which of the preferred list requests to complete first. For instance, the deduplication engine may choose between preferred list volumes based on any number of metrics, such as order in which the requests are received, change log size, deduplication value, and/or the like.

If there is no deduplication request for a preferred list volume, then at action 408 the deduplication engine examines the queue for whether there is a request for a volume in the standby list. If there is no request for a standby list volume, then the deduplication engine may return to action 402 or simply end the deduplication processing until a later time.

If it is determined that there is at least one deduplication request for a standby list volume, then the deduplication engine selects a request corresponding to a volume with the highest deduplication potential.

Various embodiments may add, omit, rearrange, or modify one or more actions of FIG. 4. For instance, method 400 may be performed continually or only at certain times, and in any event may loop multiple times before the deduplication operation ceases. In fact, some systems allow for deduplication operations during any time of day, but limit the number of deduplication operations at any one time to eight. Thus, some embodiments may include multiple deduplication operations running concurrently within a system. Of course, that is just an example, and any appropriate technique to constrain the time and/or multiplicity of deduplication operations may be implemented in various embodiments.

The described embodiments may include one or more advantages over other techniques. For instance, various embodiments provide techniques to calculate a space saving potential, thereby bringing intelligence to selection among a number of volumes. Furthermore, various embodiments favor performing space saving processing on volumes that have a higher likelihood of yielding substantial space savings. Such preference is made at the expense of volumes that show less potential for space savings. Therefore, such embodiments direct resources where those resources are more efficiently and effectively used. By contrast, some conventional deduplication systems may simply perform deduplication according to the order that a deduplication request is received, and when resources are not available, some of the volumes may not be deduplicated. However, some of the volumes that are not deduplicated may be the volumes with the most potential for savings.

Various embodiments not only add efficiency to storage systems, but may add dependability as well. For instance, customers who purchase space saving applications may expect to be able to rely on a certain amount of space savings in the system. However, conventional storage systems might or might not deliver expected space savings, depending on whether volumes with the highest deduplication potentials are actually deduplicated. Some embodiments of the present disclosure ensure that volumes with higher space saving potentials are deduplicated first, thereby delivering more consistent space savings. The customer benefits from space savings immediately, when the customer uses the storage space which was freed. The customer also benefits over the long term by being able to rely on consistent savings when making provisioning decisions. In the examples above, the preferred list allows the long term benefit to be realized by giving preference to a fixed set of volumes.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information. One or more processors at the storage server (e.g., server 102 of FIG. 1), the storage subsystems (e.g., subsystems 104 and 106), or elsewhere in the network storage system may execute such instructions to provide one or more of the actions of methods 200, 300, 400 (FIG. 2-4).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for data deduplication, the method comprising:
   determining a cumulative space savings value obtained for previous deduplication operations on a data object;
   determining an average space savings for the data object by:
     identifying data received since a previous deduplication operation;
     performing a deduplication operation on the identified data;
     calculating a percent storage space reduction for the identified data based on the deduplication operation; and
     determining an average space savings value based on the cumulative space savings value weighted by a non-deduplicated size of the data object prior to the previous deduplication operation, and further based on the percent storage space reduction for the identified data weighted by a non-duplicated amount of the identified data; and
   assigning a deduplication priority to the data object based on the average space savings value.

2. The method of claim 1, wherein the deduplication priority of the data object is processed in association with deduplication priorities of other data objects, said method further comprising performing a subsequent deduplication operation on the other data objects according to the deduplication priority of each of the data objects.

3. The method of claim 2, wherein the deduplication priority of each of the data objects is further based on a size of a change log of the respective data object.

4. The method of claim 2, wherein the deduplication priority of each of the data objects is further based on an overflow of a change log of the respective data object.

5. The method of claim 2, wherein the deduplication priority of each of the data objects is further based a performance metric of a deduplication system.

6. The method of claim 2, further comprising performing logging changes to one of the data objects in a change log based on the deduplication priority of the one data object.

7. The method of claim 1, further comprising selecting the data object for deduplication from among a plurality of data objects based on the deduplication priority of the data object.

8. An apparatus comprising:
a non-transitory, tangible computer readable storage medium storing a computer program for data duplication, wherein the computer program has instructions that, when executed by a computer processor, carry out:
determining a cumulative space savings value obtained for previous deduplication operations on a data object;
determining an average space savings for the data object by:
identifying data received since a previous deduplication operation;
performing a deduplication operation on the identified data;
calculating a percent storage space reduction for the identified data based on the deduplication operation; and
determining the average space savings value based on the cumulative space savings value weighted by the non-deduplicated size of the data object prior to the last deduplication operation, and further based on the percent storage space reduction for the identified data weighted by the non-duplicated amount of the identified data; and
assigning a deduplication priority to the data object based on the average space savings value.

9. The apparatus of claim 8, wherein the computer program has further instructions that carry out maintaining a change log of the data object based on the deduplication priority.

10. The apparatus of claim 8, wherein the computer program has further instructions that carry out assigning the deduplication priority to the data object further based on a size of a change log for the data object.

11. The apparatus of claim 8, wherein the computer program has further instructions that carry out assigning the deduplication priority to the data object further based on an overflow of a change log of the data object.

12. The apparatus of claim 8, wherein the computer program has further instructions that carryout selecting the data object for deduplication from among a plurality of data objects based on the deduplication priority of the data object.

13. A storage system comprising:
a storage device including a non-volatile storage medium and operable to store a data object thereupon; and
a deduplication manager coupled to the storage device and operable to transact data with the storage device, wherein the deduplication manager is further operable to:
determine a cumulative space savings value obtained for previous deduplication operations on the data object;
determine an average space savings for the data object by:
identifying data received since a previous deduplication operation;
performing a deduplication operation on the identified data;
calculating a percent storage space reduction for the identified data based on the deduplication operation; and
determining an average space savings value based on the cumulative space savings value weighted by a non-deduplicated size of the data object prior to the previous deduplication operation, and further based on the percent storage space reduction for the identified data weighted by a non-duplicated amount of the identified data; and
assign a deduplication priority to the data object based on the average space savings value.

14. The storage system of claim 13, wherein the deduplication manager is further operable to schedule the data object for deduplication further based on a size of a change log for the data object.

15. The storage system of claim 13, wherein the deduplication manager is further operable to schedule the data object for deduplication further based on an overflow of a change log for the data object.

16. The storage system of claim 13, wherein the deduplication manager is further operable to schedule the data object for deduplication further based on a performance metric of the storage system.

17. The storage system of claim 13, wherein the deduplication manager is further operable to log changes to the data object to a change log based on the deduplication priority.

18. The storage system of claim 15, wherein the deduplication manager is further operable to selecting the data object for deduplication from among a plurality of data objects based on the deduplication priority of the data object.

* * * * *